United States Patent Office 2,721,163
Patented Oct. 18, 1955

2,721,163

OXYGENATION OF STEROIDS IN THE 11-POSITION

Gilbert M. Shull, Roslyn Heights, and Joseph L. Sardinas, Brooklyn, N. Y., and John B. Routien, Tenafly, N. J., assignors to Chas. Pfizer & Co., Inc., New York, N. Y., a corporation of Delaware No Drawing. Application September 24, 1952, Serial No. 311,304

8 Claims. (Cl. 195—51)

This invention is concerned with the oxygenation of steroid compounds by a new method. In particular, this invention is concerned with the introduction of oxygen into the steroid molecule through the agency of certain microorganisms or the oxygenating enzymes thereof.

A number of chemical methods have been devised for the introduction of oxygen functions in steroid compounds at various points of the steroid molecule. In particular, efforts have been made to devise methods of producing 11-oxygenated steroid compounds. The procedures used to accomplish this by chemical means generally involve a number of difficult steps which are costly and often produce the desired product in very limited yield. Various biologically active compounds, which are highly desirable in the treatment of certain diseases, contain oxygen functions at the 11-position. Since this is true, it is desirable to have available convenient methods for the introduction of such groups in steroid nuclei lacking the substituent. Cortisone and compound F are examples of very valuable products bearing oxygen at the 11-position of the molecule. Many readily available, natural and synthetic steroid starting materials have no oxygen at the 11-position.

One object of the present invention is to provide a highly useful and novel method for the introduction of oxygen into steroid molecules. A further object of this invention is the provision of a method whereby an oxygen function may be introduced at the 11-position of the steroid molecule. A further object is the production of 11-oxygenated compounds which are particularly useful as intermediates in the preparation of biologically active compounds such as cortisone and compound F. Further objects will be apparent from the description given below.

It has now been found that by subjecting a variety of steroid compounds to the action of a fungus chosen from the genus Pestalotia of the order Melanconiales or by exposing the compound to the action of the oxygenating enzymes of such an organism, there is produced an oxygenated compound. It is to be understood that not all species of the genus are equally effective in accomplishing the introduction of oxygen into a steroid molecule. However, it is possible with relative ease to select a species that is highly effective for this purpose. Methods will be described below for choosing such species and for cultivation of the organisms and isolation of the products produced by the oxygenating action of the organisms. Various species of Pestalotia have been isolated and carefully characterized. Descriptions of many of these are available in standard textbooks and in the scientific literature. Suitable organisms may be selected from a variety of natural sources such as soil, water and other materials. Furthermore, a variety of these organisms is available in public culture collections from which they may be obtained.

An especially valuable species of the preferred genus of microorganisms is *Pestalotia foedans* but other species are also useful. In some cases it will be found that strains of the species show some variation in activity.

It should be understood that not only is it possible to carry out the process of this invention by means of the living organisms, but the introduction of oxygen into the steroid molecule may also be accomplished by means of the isolated oxygenating enzyme systems, either intracellular or extracellular, of the chosen organisms. These enzymes may be isolated by standard procedures used in enzymology. However, it is often more convenient to utilize the living organism for the introduction of oxygen into steroid molecules. In general, it is preferred to grow the organisms under conditions of submerged, aerobic fermentation, adding the steroid which is to be oxygenated either at the beginning of the fermentation or during its course.

The method of this invention is of particular value for the introduction of 11-oxygen functions into steroid molecules. However, in some cases, oxygen may be introduced at other portions of the molecule. The compounds produced in this manner are often of considerable value. In some cases, more than one oxygen function is introduced into a given steroid compound. When the oxygen is introduced at a desirable position and also at some undesirable position, it is often possible to remove the second oxygen function selectively without disturbing the desirable function. The oxygen that is introduced into the steroid molecule is generally in the form of an hydroxyl, although keto functions may also be formed. It is possible during specific oxygenations for a given compound to pass through the hydroxylated stage to a keto compound under the prolonged action of the oxygenating enzyme systems. In general, the compounds chosen as starting material should contain no oxygen function or other substituent at the 11-position of the nucleus. However, various groups may be present at other positions of the steroid nucleus. Thus, oxygen functions at the 3-position, at the 6-position, at the 7-position and at other points in the steroid molecule, do not interfere with the course of the reaction. Many steroid molecules are substituted at the 17-position of the nucleus with various groups such as alkyl, alkenyl, keto, carboxyl, and so forth, which in no way interfere with the method of this invention. Furthermore, the presence of double bonds at the various parts of the steroid nucleus do not affect the success of the oxygenation process. Steroid compounds suitable as starting materials for the present process may contain double bonds in various positions of the nucleus such as between the 3 and 4 carbon atoms, between the 6 and 7 carbons and so forth.

A wide variety of steroid compounds may be oxygenated by the method of this invention. These include such materials as progesterone, pregnenolone, pregnenolone acetate, desoxycorticosterone, desoxycorticosterone acetate, ergosterol, stigmasterol, and so forth. It has been found that, in the oxygenation of certain steroid compounds, more than one product may be formed. However, it is often possible to obtain good yields of specific, highly useful products. In fact, the oxygenation process is often stereo specific in the introduction of oxygen functions. For instance, progesterone is converted to the corresponding 11-α-hydroxy compound. Although some of the corresponding β compound may be present, the amount is so little as to be difficult or impossible of detection. This selectivity is, of course, highly useful in the preparation of biologically active materials such as cortisone.

The nature of the products produced by the process of this invention may be determined by standard methods which have been published in scientific literature and in other sources. The crude products obtained may be analyzed by methods such as paper chromatography. This is particularly useful for rapidly evaluating the utility of various Pestalotia species. After the oxygenation process has been conducted with a desired steroid starting material, the product may be isolated in crude form by methods which are described below and the crude mixture of products may then be analyzed by means of paper chromatography or by other methods to determine the nature and the proportion of the products. Samples of standard steroid compounds of known structure may be utilized for comparison of the products produced by the oxygenation process. A particularly valuable method for analyzing such mixtures is described in the copending patent application, Serial No. 276,678, filed March 14, 1952, by Gilbert M. Shull et al., and now abandoned and in a publication of Shull et al. in the Archives of Biochemistry, vol. 37, p. 186 (1952). In this way a variety of species of Pestalotia may be screened to select those most active in oxygenating steroids.

A further method for the analysis of oxygenated steroid products and for the separation of these products in purified form is the method of column chromatography using various adsorbents. Of particular value is the use of activated silica gel columns with a highly polar organic liquid such as ethanol absorbed on the surface of the silica gel. An example of the use of this method for the purification and separation of oxygenated steroid compounds produced by the method of this invention will be described below. Methods for the separation and analysis of oxygenated steroid products have also been described in detail in U. S. Patent 2,602,769. This patent describes the application of oxygenation procedures using a totally different group of microorganisms with various steroid compounds. In the present invention, the Pestalotia have been used to oxygenate, in a particularly efficient manner, a variety of steroid compounds. In particular, it has been noted that the selected Pestalotia bring about the reaction in a particularly rapid and efficient manner. In as little as 12 hours appreciable oxygenation takes place as compared to 24 hours or more for members of other orders of fungi.

In carrying out the oxygenation method of this invention, the microorganism selected from the genus Pestalotia generally is first grown on an agar slant of a suitable medium. The organism is then washed into a flask containing a sterile nutrient solution. One having the following composition has been found to be quite suitable:

*Table I*

| | Percent by weight |
|---|---|
| N-Z-amine B [1] | 1 |
| Cerelose | 1 |
| Basamine—Busch [2] | 0.5 |

This mixture is dissolved in tap water and adjusted to pH 6.7 with potassium hydroxide and 0.1% of calcium carbonate is added.

[1] Commercially available casein hydrolyzate.
[2] Commercially available yeast extract.

One hundred milliliters of the seeded medium is used in each of a series of 300-milliliter flasks. The mixture is shaken under sterile conditions at a temperature of about 28° C. for one to two days. The growth of microorganism may then be used to seed larger vessels containing the same medium or other suitable nutrient media.

In general, a source of carbohydrate is required, such as glucose, sucrose, or starch. In addition, a source of inorganic nitroken, such as nitrates, ammonium salts and so forth is used. This may be supplemented or replaced by an organic nitrogen source such as protein hydrolyzate, soybean meal, cottonseed meal, and so forth. Inorganic salts, particularly phosphates, potassium salts, iron salts and magnesium salts are desirable. A buffer such as calcium carbonate is also quite useful. However, the fermentation generally does not greatly change in pH during its course.

Throughout the fermentation which, on a large scale, is run in vessels equipped for submerged, aerobic fermentation, the medium is agitated and aerated at a rate of at least about one-half volume of air per volume of medium per minute. The temperature is maintained at from about 20° C. to about 35° C. and care is exercised that sterile conditions prevail throughout the preparation of the medium and during the fermentation. Occasionally, it is necessary to use an antifoam agent, many of which are described in the technical literature, in order to prevent excessive foaming of the mixture.

In conducting the process of this invention, the steroid compound which is to be oxygenated may be added to the fermentation in finely divided, solid form or as a solution in a suitable, non-toxic solvent, such as ethanol, acetone, or isopropanol. Preferably between about .01% and about 2% of the steroid by weight of the whole medium may be used. Although greater or lesser amounts may be used, there is no specific advantage. Addition of the compound may be made at the time the fermentation medium is inoculated with the microorganism that is chosen or the compound may be added after growth of the organism has been established. Alternatively, the steroid compound may be added in small portions during the course of the fermentation. The compound must be sterile in order that the mixture is not contaminated by foreign microorganisms. A further procedure that has some value is the utilization of the enzyme systems formed during the growth of a suitable species of Pestalotia. The enzymes may be extracted from the microorganism by various means, generally well known in the field of enzymology. For instance, the microorganisms may be autolyzed or otherwise disintegrated, e. g. by mechanical means, and the enzymes may be precipitated from the filtered preparation by the addition of a solvent such as acetone or other water-miscible solvents or by means of inorganic salts, e. g. ammonium sulfate. The precipitated enzyme may be utilized in a suitable medium for the oxygenation of a steroid compound. Alternatively, the filtered, aqueous extract of the enzymes may be used without isolation of the solid material.

The following examples are given by way of illustration and are not intended as a limitation of this invention. Indeed, as many apparently widely different embodiments of the present invention may be made without departing from the spirit and scope hereof, it is to be understood that the invention is only limited as defined in the appended claims.

*Example I*

A culture of *Pestalotia foedans* Sacc. and Ellis (designated in the Philadelphia Quartermaster Depot collection as Pestalotia species QM 795) was grown first on an agar slant and then in shake flasks on the medium described above (Table I). One hundred milliliters of the cultivated organisms were added to a vessel equipped for submerged fermentation and containing two liters of the sterile medium listed below:

| | Percent by weight |
|---|---|
| Cerelose | 5 |
| Potassium dihydrogen phosphate | 0.1 |
| Sodium nitrate | 0.2 |
| Magnesium sulfate heptahydrate | 0.05 |
| Potassium chloride | 0.05 |
| Ferrous sulfate heptahydrate | 0.001 |
| Tap water. | |

The mixture was adjusted to pH 6.7 with potassium hydroxide. One gram of progesterone was added to the medium before sterilization. The mixture was agitated and aerated at the rate of about one liter of air per liter of medium per minute for a total of 16 hours at a temperature of 28° C. The whole mixture was then extracted twice with two-liter portions of methylene chloride. The methylene chloride solution was washed with 2% sodium bicarbonate solution and then with water. The organic solvent solution was concentrated under vacuum to dryness. The residual product was dissolved in a few milliliters of methylene chloride.

A chromatographic column was prepared containing 50 grams of activated silica gel which had been mixed with 20 milliliters of 95% ethanol. Approximately 35 grams of the silica gel was used in the column which was 1.9 centimeters by 17 centimeters in dimension. The solution of the crude oxygenated product in a few milliliters of methylene chloride was added to the chromatographic column and this was followed by a mixture of 98 volumes of methylene chloride and two volumes of 95% ethanol. The column was jacketed and kept at slightly below room temperature by means of circulating cold water. The first fraction to leave the column was recovered progesterone. The effluent was collected in 10 milliliter fractions which were examined by means of paper chromatograms to determine the presence of the desired product. Beginning with the twenty-fifth ten-milliliter fraction, 11-α-hydroxyprogesterone appeared in the effluent. It continued to appear until the fifty-eighth ten-milliliter fraction. The combined fractions containing the desired product were concentrated to dryness under vacuum. The residual material was dissolved in warm ethyl acetate, concentrated and cooled to obtain the crystalline product. It was found that after the 11-α-hydroxyprogesterone was completely out of the column, further fractions of oxygenated materials containing two or more hydroxyl groups introduced by the oxygenation process were obtained.

A total of greater than 25% of crystalline 11-α-hydroxyprogesterone was recovered by filtration of the concentrated ethyl acetate solution. It should be noted that this is a good yield of this type of preparation and, furthermore, an appreciable amount of progesterone is recovered. The process using the *Pestalotia foedans* is particularly rapid. In this case, only 16 hours were required to complete the oxygenation of the steroid compound. In fact, an appreciably shorter period may be utilized, although the yield may not be quite as high. The physical constants of the crystalline product were determined. It was found that these were identical in all respects with authentic samples of 11-α-hydroxyprogesterone prepared by other methods.

*Example II*

A culture obtained from the Philadelphia Quartermaster Depot culture collection and designated by the Quartermaster Corps as *Pestalotia royenae* Guba (QM 531) was cultivated under aerobic conditions in a medium comparable to that of Example I. Progesterone was added to the medium in the form of an ethanol solution. After 20 hours of aerobic fermentation, the whole mixture was extracted with methylene chloride and a concentrate of the extract was analyzed by paper chromatography. The formation of 11-hydroxyprogesterone was clearly established.

Cultures of the organisms employed in Examples I and II have been deposited in the permanent collection of the American Type Culture Collection, Washington, D. C., and assigned the accession numbers ATCC 11817 and ATCC 11816, respectively.

What is claimed is:

1. A process for the production of an 11-oxygenated steroid which comprises contacting in an aqueous nutrient medium under submerged, aerobic fermentation conditions, a steroid unsubstituted at the 11-position with the oxygenating activity of a fungus of the genus Pestalotia.

2. A process as claimed in claim 1 wherein the fungus is of the species *Pestalotia royenae* ATCC #11816.

3. A process as claimed in claim 1 wherein the fungus is of the species *Pestalotia foedans* ATCC #11817.

4. A process for the production of an 11-oxygenated steroid compound which comprises aerobically cultivating a strain of a selected species of the genus Pestalotia in an aqueous nutrient medium containing a steroid bearing an 11-methylene group.

5. A process for the preparation of 11-hydroxyprogesterone which comprises contacting progesterone in an aqueous nutrient medium under submerged, aerobic fermentation conditions with the oxygenating activity of a strain of a selected species of the genus Pestalotia.

6. A process for the preparation of 11-hydroxyprogesterone which comprises cultivating a strain of an oxygenating species of the genus Pestalotia under submerged, aerobic fermentation conditions in an aqueous nutrient culture medium containing progesterone.

7. A process for the preparation of 11-α-hydroxyprogesterone which comprises cultivating a strain of the fungus *Pestalotia foedans* ATCC #11817 in an aqueous, nutrient culture medium containing progesterone under submerged, aerobic fermentation conditions.

8. A process for the preparation of 11-α-hydroxyprogesterone which comprises cultivating a strain of the fungus *Pestalotia royenae* ATCC #11816 in an aqueous, nutrient culture medium containing progesterone under submerged aerobic fermentation conditions.

References Cited in the file of this patent

UNITED STATES PATENTS

| 2,602,769 | Murray et al. | Feb. 23, 1952 |

FOREIGN PATENTS

| 4460/51 | Australia | Oct. 18, 1951 |

OTHER REFERENCES

Turfitt—Biol.-Chem. J., vol. 47 (1948), pages 376–383.